United States Patent
Polehn et al.

(10) Patent No.: US 11,004,111 B2
(45) Date of Patent: May 11, 2021

(54) PRESENTING SMART BILLBOARD CONTENT BASED ON OPTICAL PATTERN RECOGNITION OF VEHICLE INFORMATION

(71) Applicant: Verizon Patent and Licensing Inc., Arlington, VA (US)

(72) Inventors: Donna L. Polehn, Kirkland, WA (US); Kent W. Hughes, Oakland, CA (US); Kumar Sanjeev, San Ramon, CA (US); Steven R. Rados, Danville, CA (US); Thomas W. Haynes, Concord, CA (US); Nithya Krishnaswamy, Walnut Creek, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 651 days.

(21) Appl. No.: 14/516,253

(22) Filed: Oct. 16, 2014

(65) Prior Publication Data

US 2016/0110759 A1    Apr. 21, 2016

(51) Int. Cl.
*G06Q 30/02*    (2012.01)
*G06K 9/46*     (2006.01)

(52) U.S. Cl.
CPC . *G06Q 30/0251* (2013.01); *G06K 2009/4666* (2013.01); *G06K 2209/15* (2013.01)

(58) Field of Classification Search
CPC .......... G06Q 30/0251; G06K 2209/15; G06K 2009/4666

USPC ...................................................... 705/14.49
See application file for complete search history.

(56) References Cited

U.S. PATENT DOCUMENTS

| | | | | |
|---|---|---|---|---|
| 5,030,957 A | * | 7/1991 | Evans | G01S 19/14 342/357.41 |
| 9,293,042 B1 | * | 3/2016 | Wasserman | G06Q 30/0265 |
| 2003/0096621 A1 | * | 5/2003 | Jana | G08G 1/0104 455/456.1 |
| 2004/0220917 A1 | * | 11/2004 | Evans | G06F 17/30454 |
| 2007/0006077 A1 | * | 1/2007 | Grubbs | H04N 21/4722 715/716 |
| 2013/0262275 A1 | * | 10/2013 | Outwater | G06Q 10/02 705/27.1 |

(Continued)

FOREIGN PATENT DOCUMENTS

WO    WO 2014/072971    *    5/2014    ............... G06T 7/20

OTHER PUBLICATIONS

"Advertising on Public Display Networks"; FLorian Alt and Albrecht Schmidt; IEEE 2012.*

*Primary Examiner* — Victoria E Frunzi

(57) ABSTRACT

A system may use optical character recognition ("OCR") techniques to identify license plates or other textual information associated with vehicles. Based on this OCR information, the system may determine additional information, such as users associated with the vehicles. The system may further obtain other information, such as history information associated with the vehicles and/or the users (e.g., via an "opt-in" data collection service). Ad content may be selected based on trends associated with the users and/or vehicles, and may be presented via "smart" billboards (e.g., billboards that may dynamically display different content).

20 Claims, 16 Drawing Sheets

(56) References Cited

U.S. PATENT DOCUMENTS

| | | | |
|---|---|---|---|
| 2013/0325629 A1* | 12/2013 | Harrison | G08G 1/015 |
| | | | 705/14.66 |
| 2014/0070963 A1* | 3/2014 | DeLorean | G08G 1/091 |
| | | | 340/917 |
| 2014/0172571 A1* | 6/2014 | Fabrikant | G06Q 30/0261 |
| | | | 705/14.58 |
| 2014/0279012 A1* | 9/2014 | Scofield | G06Q 30/0261 |
| | | | 705/14.58 |

* cited by examiner

300

| Vehicle ID | Vehicle info. | User info. |
|:---:|:---:|:---:|
| Car_A | 305-1 | 310-1 |
| Car_B | 305-2 | 310-2 |
| ⋮ | ⋮ | ⋮ |
| Car_N | 305-N | 310-N |

| License plate | State | Make | Model | Bumper sticker text | Location history | Misc. info/tags |
|---|---|---|---|---|---|---|
| AAA1234 | CA | Shevrolay | Carvelle | Say no to meat! | <location history> | Slow driver |
| XYZ6789 | MD | Honday | Civix | <None> | <location history> | <None> |
| ABC6789 | VA | <unknown> | <unknown> | <None> | <location history> | Tour bus |

| MDN | Name | Age | Location history | Device/browsing history | Misc. info/tags |
|---|---|---|---|---|---|
| 123-456-7890 | Steve Rogers | 84 | <location history> | <device/browsing history> | Likes fast food |
| 321-654-0987 | Bruce Banner | 45 | <location history> | <device/browsing history> | <None> |
| 789-555-0123 | Reed Richards | 52 | <location history> | <device/browsing history> | Shopping for a new car |

| Advertiser_ID | Priority | Ad info. |
|---|---|---|
| Advertiser_A | 99 | 505-1 |
| Advertiser_B | 85 | 505-2 |
| Advertiser_M | 33 | 505-M |

| Ad conditions | Ad | Duration |
|---|---|---|
| >10% vehicles out of state | Static_Ad_1 | <Default> |
| Speed < 10km/hr + > 5% Shevrolay cars | Video_Ad_1 | 30 sec. |
| Speed > 50 km/hr | Static_Ad_2 | 5 sec. |
| Driver age > 25 years | Static_Ad_3 | <Default> |

FIG. 5B

PRESENTING SMART BILLBOARD CONTENT BASED ON OPTICAL PATTERN RECOGNITION OF VEHICLE INFORMATION

BACKGROUND

Advertisers generally have an interest in presenting advertisement ("ad") content to potential consumers. One effective way of reaching consumers is by placing billboards on roadways, so that drivers and/or passengers of vehicles, traveling on the roadways, may see ad content presented on the billboards. Some billboards make use of technology that shows changing content, such as video ad content, rotating ads (e.g., ads that change on a periodic basis), etc.

Some optical character recognition ("OCR") techniques exist, whereby vehicle information may be automatically obtained. One such example is license plate readers, which may include a camera that captures an image of a license plate of a vehicle, and logic to perform OCR on text in the image, in order to determine a license plate number of the vehicle. An example of an entity that uses such techniques today is a law enforcement agency, which may use such OCR techniques to determine whether particular vehicles have any outstanding violations and/or to obtain records associated with a vehicle.

BRIEF DESCRIPTION OF THE DRAWINGS

FIG. 3A illustrates an example data structure that may be stored by a user information repository, and which may include information linking users to vehicles;

FIG. 3B illustrates an example data structure that may be stored by a user information repository, and which may include information regarding vehicles;

FIG. 3C illustrates an example data structure that may be stored by a user information repository, and which may include information regarding users;

FIGS. 5A and 5B illustrate data structures that may be stored by an advertiser information repository, and which may be used to select ad content to present on a smart billboard;

DETAILED DESCRIPTION OF PREFERRED EMBODIMENTS

The following detailed description refers to the accompanying drawings. The same reference numbers in different drawings may identify the same or similar elements.

Some implementations, describe herein, may provide a "smart" billboard, which may be used to present targeted ad content. For example, the targeted ad content may be selected based on information identified by an OCR system that reads license plates of vehicles that are near a smart billboard (e.g., traveling on a road that is adjacent to, or has a line of sight to, the smart billboard). In some implementations, and as described further below, the targeted ad content may be selected based on one or more other types of information, such as user information that has been linked to vehicle information.

Figure 1:
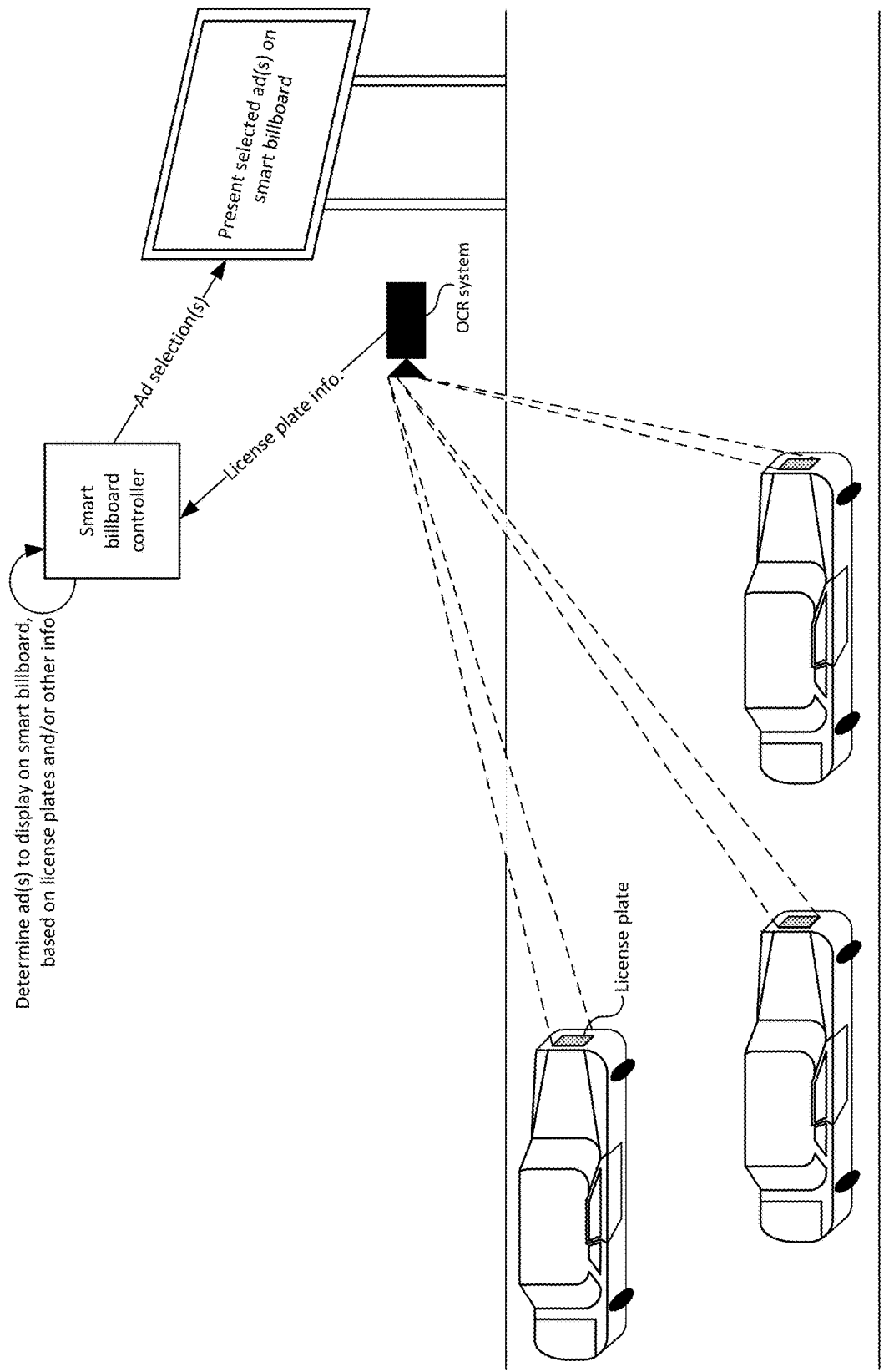
FIG. 1 illustrates an example overview of implementations described herein, in which OCR techniques may be used to collect information regarding license plates of vehicles, and in which the information may be used to select and present ad content via a smart billboard.

As shown in FIG. 1, for example, a set of vehicles (e.g., three cars in this example) may be traveling along a roadway. An OCR system, which may include an image capture device, such as a camera, may capture images associated with the vehicles, and may use OCR techniques to identify license plate information associated with the vehicles. The license plate information may include, for example, an alphanumeric sequence of letters and/or numbers that uniquely identify the license plate (referred to herein as "license plate number," even though the license plate number may include, or may be entirely comprised of, alphabetic characters and/or other types of symbols).

The OCR system may provide the license plate information (shown in the figure as "License plate info.") to a smart billboard controller (which may be connected to the OCR system via a wireless (e.g., cellular) interface and/or a wired interface). The smart billboard controller may use the license plate information, of the set of vehicles, to select ad content for display on the smart billboard. For example, the smart billboard controller may identify history information associated with the vehicles (e.g., a location history) and/or other OCR information (e.g., an OCR-determined make/model of the car, a state that issued the license plate, and/or other miscellaneous information that has been associated with the license plate). The smart billboard controller may use the information, associated with the vehicles, in selecting ad content for display on the smart billboard.

Additionally, or alternatively, the smart billboard controller may use information, linking particular vehicles to particular users (e.g., may determine that a particular license plate number corresponds to a particular user). The smart billboard controller may identify other types of information associated with the user (e.g., types of information that are non-vehicle related, such as a location history of a mobile telephone associated with the user, a purchase history associated with the user, a web browsing history of the user, Internet/television/telephone subscription information, etc.), and may use such information when selecting ad content for display on the smart billboard. Further, the smart billboard controller may additionally, or alternatively, use other types of information (e.g., information that is not necessarily tied to a particular user or vehicle), such as speed camera information (e.g., information that is captured by one or more speed cameras or other devices that determine speed of passing vehicles), weather service information, etc. when selecting ad content for display on the smart billboard.

As described below, ad content may include static content (e.g., still images) and/or video content. The smart billboard controller may, in some implementations, determine whether a still image or video content should be displayed based on one or more factors, such as an average speed of vehicles in a region adjacent to or with line of sight to the smart billboard. Additionally, or alternatively, the smart billboard controller may determine a duration, for which ad content should be displayed, based on the same and/or different factors.

The smart billboard ad selection techniques, described herein, may provide for previously untapped ad targeting potential. For example, billboards are highly visible ad delivery mechanisms, and the targeting of ad content provided via billboards may enhance the marketing capabilities of advertisers that make use of implementations described herein. Further, smart billboard providers may enhance their own product (i.e., billboards) using techniques described herein, thereby providing enhanced monetization opportunities to such providers. Further still, potential consumers may enjoy viewing ad content that is more relevant to them, as opposed to generic ad content that may be of no relevance to the potential consumers.

Figure 2:
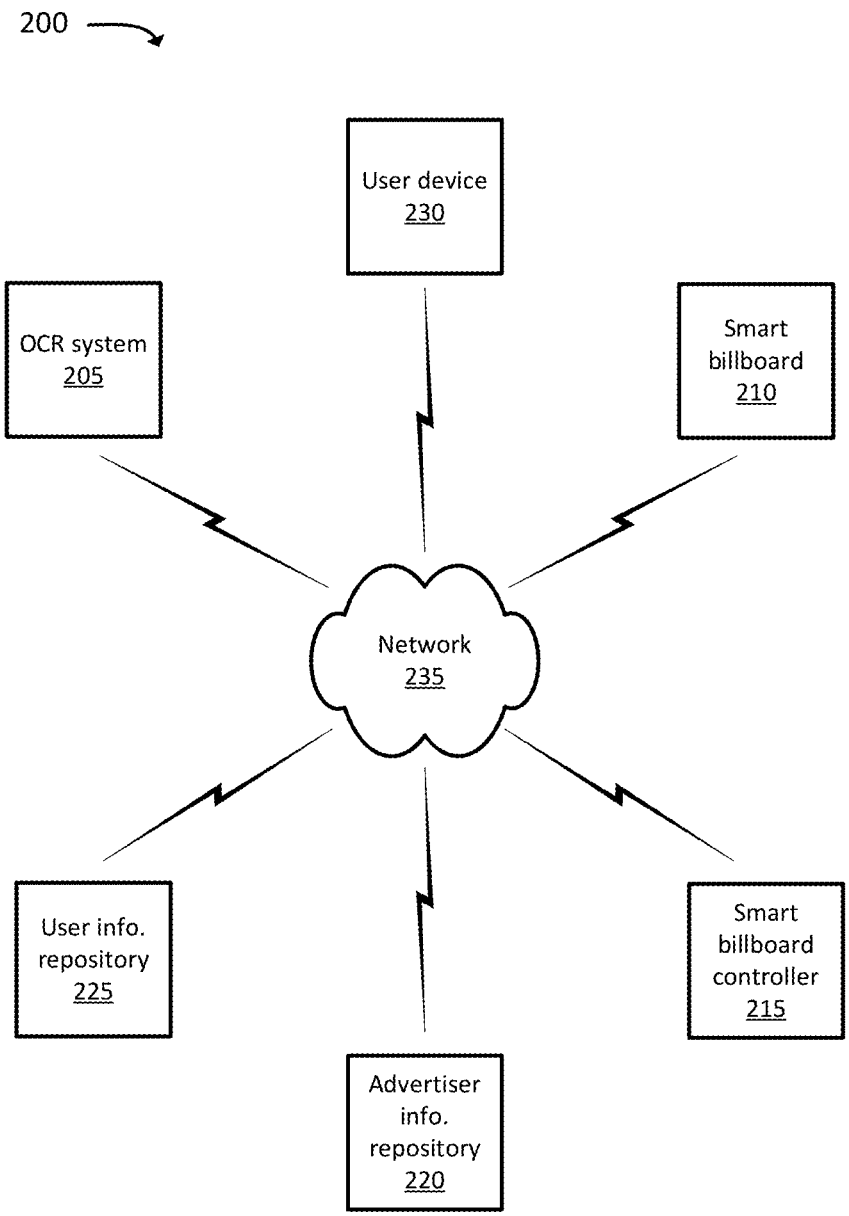
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include OCR system 205, smart billboard 210, smart billboard controller 215, network 235, user information repository 225, user device 230, and network 235.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

OCR system 205 may include one or more devices that capture images and perform OCR techniques to identify text within the images. For example, OCR system 205 may include one or more cameras (e.g., still cameras and/or video cameras) that capture images of vehicles, or portions of vehicles, on a roadway. OCR system 205 may, for example, include a "license plate reader" device, that identifies license plate numbers of license plates attached to vehicles that travel along a roadway. OCR system 205 may be communicatively coupled with one or more other devices, such as smart billboard controller 215, via network 235. For example, OCR system 205 may include a wired interface (e.g., an Ethernet interface) and/or a wireless interface (e.g., a cellular interface) to network 235.

Smart billboard 210 may include one or more devices that present ad content, such as still image ad content and/or video ad content. Smart billboard 210 may thus include a display device, such as a liquid crystal display ("LCD") device, a light emitting diode ("LED") display device, and/or another type of display device. The display device, included in smart billboard 210, may be relatively large (e.g., a suitable size so as to be seen from a roadway, potentially hundreds of meters or over a kilometer away). In some implementations, smart billboard 210 may include an audio output device, such as one or more speakers. Smart billboard 210 may, in some implementations, include a storage device (e.g., a hard drive, a flash drive, a solid state drive, a hybrid drive, etc.) that stores ad content (e.g., video, audio, and/or image files that correspond to ad content).

In some implementations, smart billboard 210 may include multiple display areas, which may present different content. The display areas may be polarized in a manner such that different display areas may be visible to vehicles in different lanes. The multiple display areas may thus provide an enhanced level of granularity. That is, content may be targeted not only based on users and/or vehicles in the vicinity of smart billboard 210, but also on a per-lane basis (e.g., content that may be relevant to vehicles in one lane may be less relevant to vehicles in another lane).

Smart billboard 210 may communicate with one or more other devices via network 235. Smart billboard 210 may, for example, receive instructions, from smart billboard controller 215, to present particular ad content stored by smart billboard 210. Additionally, or alternatively, smart billboard 210 may receive ad content from smart billboard controller 215, and may present the received ad content.

Smart billboard controller 215 may include one or more devices that select ad content to display via one or more smart billboards 210. That is, in some implementations, one smart billboard controller 215 may control one smart billboard 210, while in some implementations, one smart billboard controller 215 may control multiple smart billboards 210. Examples of how smart billboard controller 215 may select ad content, for display on smart billboard 210, are described in detail below. Briefly, smart billboard controller 215 may select ad content based on information received from OCR system 205, advertiser information repository 220, and/or user information repository 225. Smart billboard controller 215 may communicate with OCR system 205, smart billboard 210, advertiser information repository 220, user information repository 225, and/or more other devices via network 235.

Advertiser information repository 220 may include one or more devices that receive, store, and/or output information associated with ad content and/or advertisers associated with the ad content. Examples of the types of information that may be stored by advertiser information repository 220 are described in greater detail below. Briefly, the information, stored by advertiser information repository 220, may include ad content, and/or conditions under which particular ad content should be presented. OCR system 205 may communicate with one or more other devices, such as smart billboard controller 215, via network 235.

User information repository 225 may include one or more devices that receive, store, and/or output information associated with one or more users. The users may correspond to potential consumers, at whom advertisers may desire to target ad content. Examples of the types of information that may be stored by user information repository 225 are described in greater detail below. Briefly, the information, stored by user information repository 225, may include names of users, preferences of users (e.g., whether a user prefers to purchase a particular product or service), user history information (e.g., location history, web browsing history, messaging history, purchase history, etc.), and/or other types of user-specific information.

The information, stored by user information repository 225, may include information provided directly from a user (e.g., via a questionnaire), and/or information collected based on user activities (e.g., by a device or service not explicitly shown in FIG. 2). Users may be given the choice to "opt in" to services that collect information regarding user activities, before any such services begin collecting such information. Further, users may be given the choice to "opt out" of similar services, and/or to access or delete any and all information collected by way of any such collection service. Users may be given the opportunity to temporarily "turn off" information collection (e.g., for a specific period of time, and/or indefinitely), and/or to be notified when any such information collection is taking place.

User device 230 may include any computation and communication device that is capable of communicating with one or more networks (e.g., network 235). For example, user device 230 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 230 may include one or more location determination components, such as a global positioning system ("GPS") device, and may report its location to network 235 at various intervals (e.g., may "push" the location information and/or provide the location information based on an authorized request). User device 230 may communicate with other devices, such as one or more other user devices 230, via network 235.

Network 235 may include one or more networks, via which one or more devices, shown in FIG. 2, may communicate. For example, network 235 may include an evolved packet system ("EPS") that includes a Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 230 and/or another device may communicate with the EPC network. The EPC network may include one or more serving gateways ("SGWs"), mobility management entities ("MMEs"), and/or packet data network ("PDN") gateways ("PGWs"), and may enable user device 230 to communicate with a PDN (e.g., the Internet) and/or an IP Multimedia Subsystem ("IMS") core network. The IMS core network may manage authentication, session initiation, account information, a user profile, etc. associated with user device 230.

Network 235 may additionally, or alternatively, include a wide area network ("WAN"), a metropolitan area network ("MAN"), the Internet, a fiber optic-based network, and/or a combination of these or other types of networks. Network 235 may include one or more wireless networks in addition to, or in lieu of, an LTE network. For example, network 235 may include a Code Division Multiple Access ("CDMA") 2000 1x network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network. In some implementations, network 235 may be communicatively coupled to one or more other networks.

FIGS. 3A-3C illustrate example data structures 300-310, which may be stored by user information repository 225. Data structure 300, shown in FIG. 3A, may link vehicle data (e.g., information regarding a particular vehicle, as described further below with respect to example data structure 305) to user data (e.g., information regarding a particular user, as described further below with respect to data structure 310).

For instance, data structure 300 may include a "Vehicle identifier [ID]" field, a "Vehicle information [info.]" field, and a "User information" field. The vehicle identifier field may include a unique identifier associated with a particular vehicle, and may include, or be derived from, a license plate number associated with the vehicle. In some implementations, the vehicle identifier field may include another type of identifier that is not based on a license plate number. The vehicle information field may correspond to information stored in data structure 305 (described below with respect to FIG. 3B), while the user information field may correspond to information stored in data structure 310 (described below with respect to FIG. 3C). In some implementations, a particular vehicle may be linked to multiple users, while in some implementations, a particular user may be linked to multiple vehicles. In some implementations, a user may indicate one or more vehicles with which he or she is associated. Additionally, or alternatively, associations between vehicles and/or users may be determined using one or more other techniques (e.g., as described in greater detail below).

As shown in FIG. 3B, data structure 305 may include information regarding one or more vehicles, and may include the following example fields: "License plate," "State," "Make," "Model," "Bumper sticker text," "Location history," and/or "Miscellaneous [misc.] information/tags." Each record (or "row"), shown in FIG. 3B, may correspond to a particular vehicle. For example, record 305-1 may correspond to a first vehicle, record 305-2 may correspond to a second vehicle, and record 305-3 may correspond to a third vehicle.

The license plate field may include text associated with a license plate of a particular vehicle, the state field may include information regarding a state (or other type of province or territory) that issued the license plate, the make field may include a name of a make of the vehicle (e.g., a manufacturer of the vehicle), the model field may include a name of a model and/or trim level or variant of the vehicle and the bumper sticker text field may include text included on one or more bumper stickers of the vehicle. Some of the information, stored by data structure 305, may be information obtained by OCR system 205. For instance, an image capture device, associated with OCR system 205, may capture an image of a particular vehicle, and OCR system 205 may use an OCR technique to determine the above information associated with the vehicle. Additionally, or alternatively, a user, associated with the vehicle, may provide some or all of the above information. For instance, a user may indicate a make and/or model of the vehicle, as well as the license plate number associated with the vehicle.

The location history, for a particular vehicle, may indicate locations at which the vehicle has been observed over time. The location history may be based on, for example, locations of image capture devices (e.g., image capture devices associated with one or more OCR systems 205) that have captured images of the particular vehicle (e.g., where the captured images include text corresponding to that vehicle's license plate number). Thus, in some implementations, the location history, for a particular vehicle, may include, or may be derived from, locations of image capture devices that have captured images of the particular vehicle.

The miscellaneous info/tags field, for a particular vehicle, may include other types of information not specifically mentioned above. For instance, this field may include information obtained from, and/or derived by, other sources. This field may store, for example, a set of "tags" associated with a vehicle, which may be used by smart billboard controller 215 when selecting ad content. For example, this field may include information regarding characteristics and/or trends associated with the vehicle (e.g., paint color, average speed, whether the vehicle is a specialty purpose vehicle (e.g., a tour bus, a taxi cab, a limousine, or another type of specialty vehicle), etc.).

Referring to FIG. 3C, data structure 310 may include information regarding a particular user, and may include the following example fields: "Mobile device number [MDN]," "Name," "Age," "Location history," "Device/browsing history," and "Miscellaneous info/tags." Each record (or "row"), shown in FIG. 3C, may correspond to a particular user. For example, record 310-1 may correspond to a first user, record 310-2 may correspond to a second user, and record 310-3 may correspond to a third user.

The MDN field may include a telephone number and/or another identifier (e.g., an International Mobile Station Equipment Identity ("IMEI") value, an International Mobile Subscriber Identity ("IMSI") value, a media control access ("MAC") address, etc.) that may be used to identify a device (such as a particular user device 230) associated with a particular user. In some implementations, one user may be associated with multiple MDNs.

The location history field may store information regarding locations at which the user (e.g., a device associated with the user) may have been identified as being located. For instance, a GPS device, associated with user device 230, may identify the location of user device 230, and/or network 235 may determine and record the location of user device 230 (e.g., using a cell triangulation technique). In some implementations, the location history field may be based on social media "check ins," in which the user reports his or her location manually.

The device/browsing history field may store information regarding how one or more user devices 230, associated with the user, have been used. For instance, this field may store information regarding web sites that have been visited by the user, messages that have been sent and/or received by the user, calls that have been placed or received by the user, purchase information (e.g., products and/or services purchased via user device 230), subscription information (e.g., a cellular and/or television subscription), and/or other types of information. The information, stored in the device/browsing history field (and/or one or more other fields, such as the location history field), may be received from one or more devices or services that collect such information. As mentioned above, the user may opt in and/or opt out of any such service, and may access and/or remove any collected information regarding the user.

The miscellaneous info/tags field, for a particular user, may include other types of information not specifically mentioned above. For instance, this field may include information obtained from, and/or derived by, other sources. This field may store, for example, a set of "tags" associated with a user, which may be used by smart billboard controller 215 when selecting ad content. For example, this field may include information regarding characteristics and/or trends associated with the user (e.g., types of goods and/or services in which the user has expressed interest, etc.).

Figure 4A:
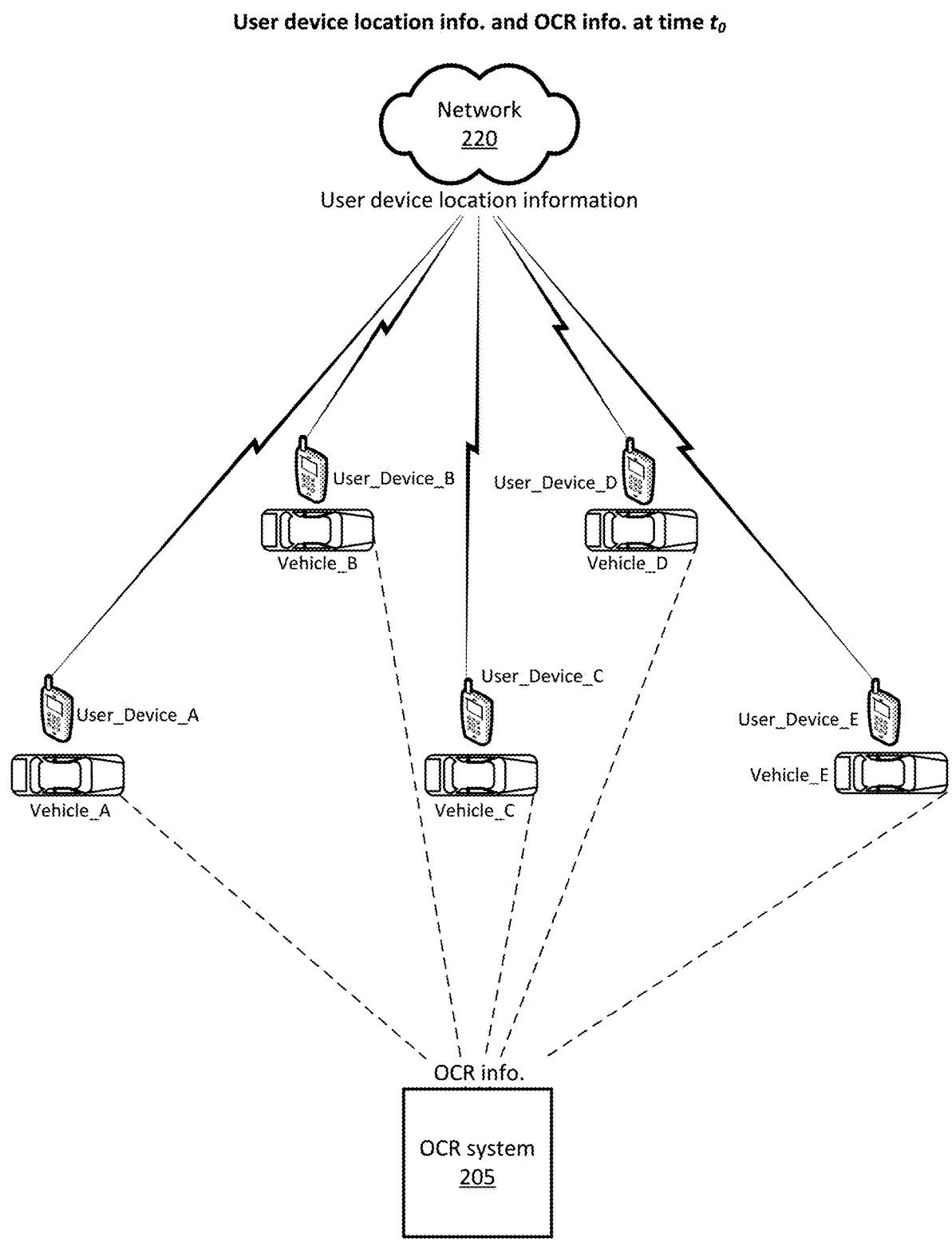
FIGS. 4A-4C conceptually illustrate a process for linking user information to vehicle information.
Figure 4B:
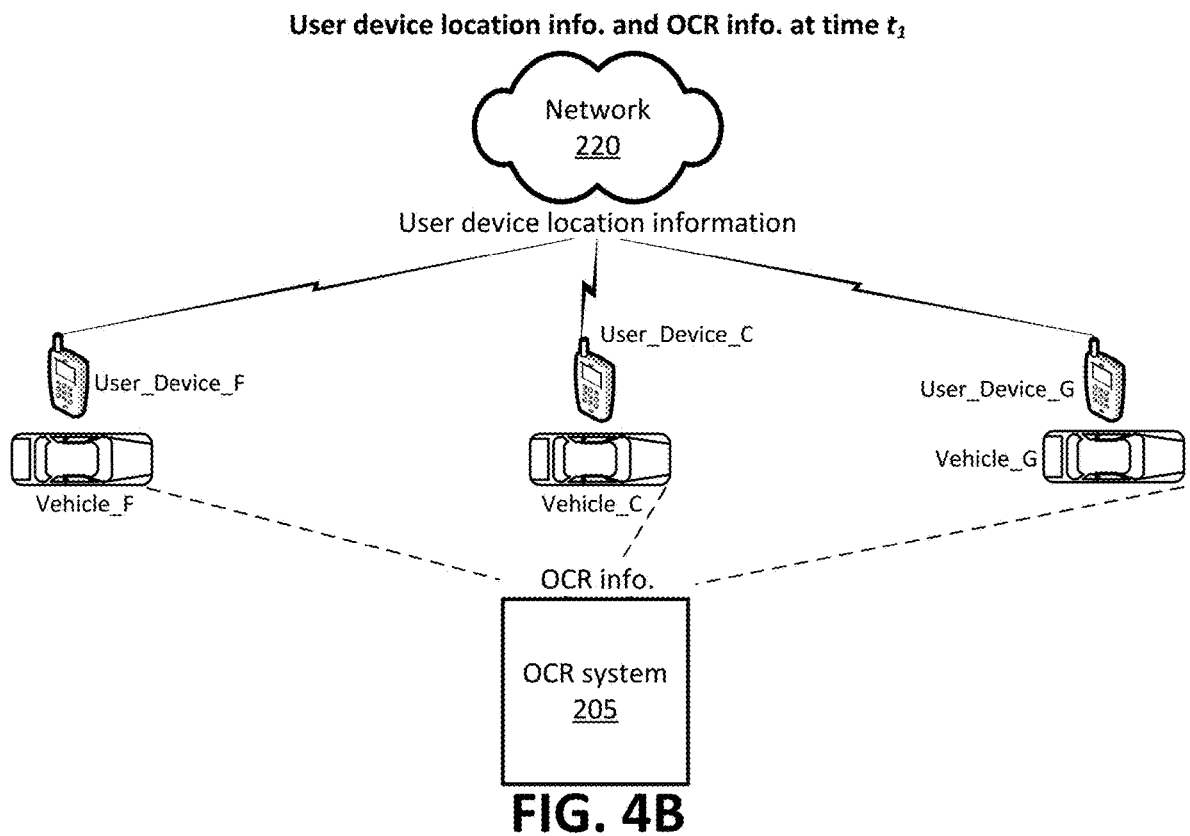
Figure 4C:
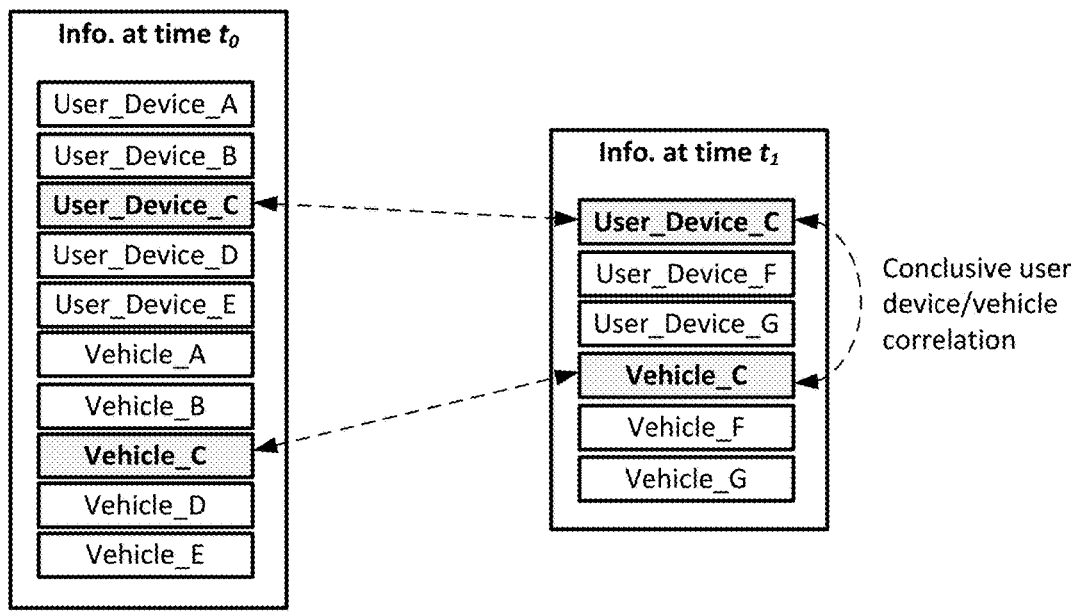

FIGS. 4A-4C may conceptually illustrate a process for linking user information to vehicle information, in accordance with some implementations. FIG. 4A, for instance, illustrates a set of vehicles and user devices present at a particular region at a particular time ("time $t_0$"), while FIG. 4B illustrates another set of vehicles and user devices present at the same region (or a different region) at another time ("time $t_1$"). FIG. 4C illustrates how user device and license plate data, collected at times $t_0$ and $t_1$, can be used to link a particular vehicle (e.g., license plate) to a particular user device.

Referring to FIG. 4A, OCR system 205 may be used to identify license plate information of a set of vehicles (i.e., "Vehicle_A," "Vehicle_B," "Vehicle_C," "Vehicle_D," and "Vehicle_E," in this example). The vehicles, shown in this figure, may be located within the same general vicinity (e.g., within a field of view of a camera associated with OCR system 205) at time $t_0$. Additionally, or alternatively, FIG. 4A may represent that the set of vehicles was identified by OCR system 205 within a relatively brief duration of time (e.g., within one second, within five seconds, etc.) and, as such, it may be inferred that these vehicles were at the same location at roughly the same time (i.e., at time $t_0$, in this example).

As also shown in FIG. 4A, each vehicle may be associated with a user device (e.g., a respective one of "User_Device_A," "User_Device_B," "User_Device_C," "User_Device_D," or "User_Device_E"), such as a mobile telephone. For example, passengers or drivers of the vehicles may be carrying a mobile telephone while seated in the vehicle, as the vehicle is identified by OCR system 205 at time $t_0$. In this example, Vehicle_A may be associated with User_Device_A, Vehicle_B may be associated with User_Device_B, and so on.

The locations of the user devices may be determined (e.g., using network-based location determination techniques such as cellular triangulation, GPS-based techniques, etc.). For instance, the user devices may determine their own locations and/or another device may determine the locations of the user devices (e.g., one or more devices associated with network 235).

The locations of the user devices may, in some implementations, be determined on an ongoing basis. In some implementations, the locations of the user devices, and/or the location of OCR system 205, may be provided to user information repository 225 and/or to one or more other devices. For example, as described above, the location information, regarding a particular vehicle (e.g., license plate), may be stored by data structure 305. As another example, and as also described above, the location information, regarding a particular user device, may be stored in a "location history" field of data structure 310. As described below, this information may be used to definitively link a user device to a vehicle.

Referring to FIG. 4B, OCR system 205 may be used to identify license plate information of another set of vehicles (i.e., "Vehicle_C," "Vehicle_F," and "Vehicle_G," in this example). The vehicles, shown in this figure, may be located within the same general vicinity (e.g., within a field of view of a camera associated with OCR system 205) at time $t_1$. OCR system 205, in this figure, may be associated with the same camera as a camera associated with OCR system 205 shown in FIG. 4A, or may be associated with a different camera. As similarly described above with respect to FIG. 4A, the location of OCR system 205 may be recorded along with license plate information (e.g., in data structure 305), and user device locations at time $t_1$ may be recorded (e.g., in data structure 310).

As shown in FIG. 4C, a conclusive determination, of a particular user device that is associated with a particular vehicle, may be able to be made based on the information recorded at times $t_0$ and $t_1$. For example, as shown, User_Device_C and Vehicle_C were both present in the same general vicinity at both times $t_0$ and $t_1$. Further, none of the other vehicles and user devices, present at time $t_0$, were present at time $t_1$. Based on the presence of User_Device_C and Vehicle_C at different times, and further based on the absence of other user devices and vehicles at those times, it may be determined that User_Device_C should be linked to Vehicle_C. For example, user information repository 225 and/or another device may make this determination. Referring to the example shown in FIG. 3A, record 305-1 may correspond to a vehicle whose license plate was linked to a user device of a user associated with record 310-1.

FIGS. 5A and 5B illustrate example data structures 500 and 505, which may be stored by advertiser information repository 220, and which may be used to select ad content to present on a smart billboard. For instance, as shown in FIG. 5A, data structure 500 may include information regarding advertisers, such as identifying information ("Advertiser_ID"), priority information, and ad information. The Advertiser_ID field may include an identifier associated with an advertiser, such as a name, an account number, and/or another type of unique identifier. The priority field may include weighting or priority information, which may be used (e.g., by smart billboard controller 215) to select which advertiser's ad content should be displayed. For example, when an advertiser's ad content is displayed on smart billboard 210, that advertiser's priority may be reduced, and/or the priority of other advertisers may be increased. In this way, multiple advertisers may "share" the use of smart billboard 210. Additionally, or alternatively, certain advertisers may have higher priorities than other advertisers, based on paying a premium for the higher priorities.

The ad information field, for a particular advertiser, may include an instance of data structure 505. For example, Advertiser_A may be associated with a first instance 505-1 of data structure 505, Advertiser_B may be associated with a second instance 505-2 of data structure 505, and so on. As shown in FIG. 5B, data structure 505 may include conditions under which a particular ad should be played ("Ad conditions"), an identifier of the ad to be played if the conditions are met, and a duration that the ad should be played if the conditions are met.

For instance, as shown in the first row of example data structure 505 in FIG. 5B, the ad conditions field may specify a condition of ">10% of vehicles out of state." This condition may be met if greater than ten percent of vehicles, associated with a particular smart billboard 210 (e.g., driving through a region that is within a line of sight of smart billboard 210), are out of state. This information may, for example, be determined based on information, regarding multiple vehicles, stored by data structure 305. If the condition is met (e.g., if greater than ten percent of vehicles associated with smart billboard 210 over a duration period of time are from out of state), then ad content with the identifier, "Static_Ad_1," should be displayed on smart billboard 210. In some implementations, a particular duration may not be specified in data structure 505 (represented as "<Default>" in the figure). In these situations, smart billboard controller 215 may determine a duration for which to present the ad content.

In some implementations, conditions may be specified in a hierarchical and/or compound manner. For example, conditions may be evaluated in a particular order, and when the first true condition, in the order, is identified, the ad associated with that condition may be selected. Additionally, or alternatively, some conditions may be associated with other subordinate conditions. For example, if a particular condition is met, one or more "subordinate" conditions may be evaluated in order to select ad content to be displayed and/or a duration which to display the ad content.

In some implementations, the "ad" field may include an identifier, such as a uniform resource locator ("URL"), file name, ad name, and/or another unique identifier, based on which the ad content can be identified. In some implementations, the "ad" field may include actual ad content, such as a compressed or uncompressed image or video file. The information, stored in data structures 500 and/or 505 may be provided by one or more advertisers, and/or an administrator associated with smart billboard controller 215 and/or advertiser information repository 220.

Figure 6:
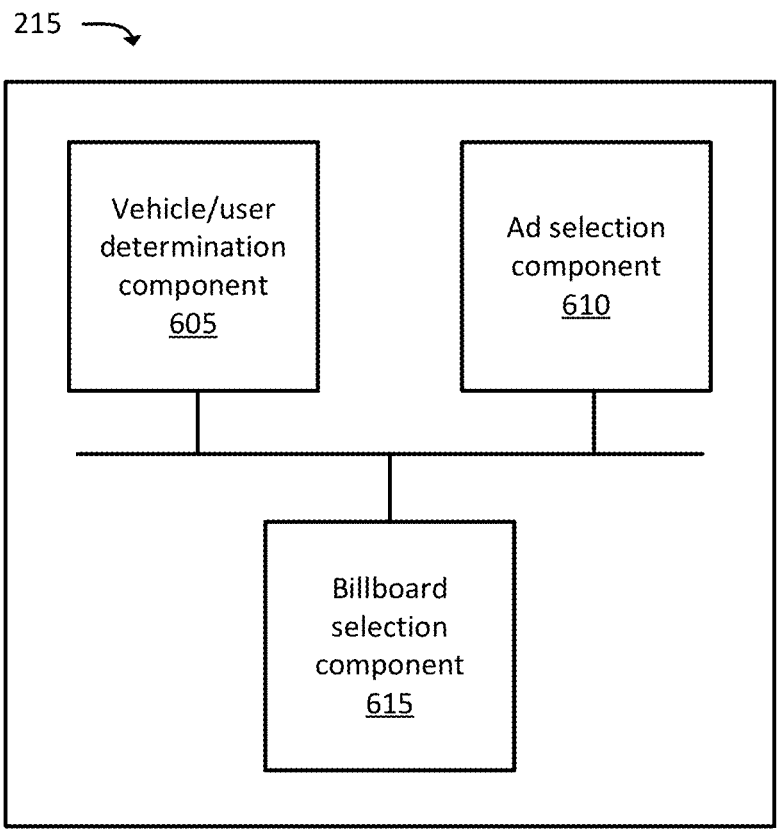
FIG. 6 illustrates example functional components of a smart billboard controller, in accordance with some implementations.

FIG. 6 illustrates example functional components of smart billboard controller 215, in accordance with some implementations. For instance, as shown, smart billboard controller 215 may include vehicle/user determination component 605, ad selection component 610, and billboard selection component 615. These components may be implemented via hardware circuitry, software logic, and/or a combination of hardware and/or software associated with smart billboard controller 215. In some implementations, smart billboard controller 215 may include additional, fewer, different, and/or differently arranged components. Furthermore, some, or all, of the functionality of one or more components may be performed by one or more other components.

Vehicle/user determination component 605 may identify vehicle and/or user data (e.g., based on information stored in one or more of data structures 300-310, described above with respect to FIGS. 3A-3C). For example, vehicle/user determination component 605 may identify vehicles in a particular region, such as a region associated with a particular smart billboard 210 (e.g., based on the location history information stored in data structure 305 and/or data structure 310). Vehicle/user determination component 605 may use the information in data structures 300-310 to analyze trends, demographics information, and/or other types of information regarding users and/or vehicles in the particular region. For example, vehicle/user determination component 605 may identify types of vehicles that are present in the region (e.g., a proportion of the vehicles are a particular make and/or model), identify bumper sticker text of vehicles present in the region, identify an average age of vehicles in the region, etc. Vehicle/user determination component 605 may also, in some implementations, receive information from other sources. For example, vehicle/user determination component 605 may receive information from a speed determination service, which provides information regarding an average speed of vehicles in the region.

Ad selection component 610 may select an ad content to display on smart billboard 210, based on the information identified, generated, and/or analyzed by vehicle/user determination component 605. Additionally, or alternatively, ad selection component 610 may use advertiser information (e.g., based on information stored in one or more of data structures 500 and/or 505, as described above with respect to FIGS. 5A and 5B) when selecting the ad content.

For example, ad selection component 610 may, based on the information received from vehicle/user determination component 605, identify trends and/or may generate a profile of the vehicles in a region from which smart billboard 210 may be viewed. For instance, ad selection component 610 may determine that there are a relatively large quantity and/or proportion of vehicles of a particular make and/or model, that there are a relatively large quantity and/or proportion of vehicles that are from a particular state (or that are in-state plates, or are out of state plates), location histories of vehicles, etc.

As one example of how location history may be used, distance and/or time of a particular vehicle, at a present location and a present time, from a previous location and a previous time, may be used to infer that the vehicle may be in need of fuel. For instance, if particular vehicle is identified at four hours and 500 km from a previous location, ad selection component 610 may determine that the vehicle may be low on fuel, and an advertisement for a gasoline station should be presented. Additionally, or alternatively, ad selection component 610 may infer that a user, in the vehicle, may be hungry, and an advertisement for one or more restaurants may be selected.

Ad selection component 610 may additionally, or alternatively, identify trends and/or generate a profile of users in the region from which smart billboard 210 may be viewed. For instance, ad selection component 610 may identify products in which users are interested, demographics of users, location histories of users, etc.

Ad selection component 610 may compare the identified vehicle and/or user information to information regarding advertisers and/or ad content, in order to determine which ad content to display on smart billboard 210. Additionally, or alternatively, as mentioned above, in some implementations, may select ad content based on an advertiser priority. Ad selection component 610 may, for instance, identify ad content in a rule-based manner (e.g., based on conditions specified in data structure 505), by comparing user and/or vehicle information to conditions, specified by one or more advertisers, regarding ad content. Ad selection component 610 may, in some implementations, determine a duration for which to display ad content. For example, ad selection component 610 may determine the duration based on average speed of vehicles, and/or one or more other conditions.

Billboard selection component 615 may select one or more smart billboards 210, on which to display the content selected by ad selection component 610. For instance, situations may arise where a single OCR system 205 is in place for multiple smart billboards 210. For instance, one camera may capture OCR information in a particular region, while multiple smart billboards 210 may be located in the particular region. In some implementations, billboard selection component 615 may select multiple smart billboards 210 based on average speed of vehicles. For example, in situations where vehicles are traveling relatively quickly, billboard selection component 615 may select multiple consecutive smart billboards 210, on which to display ad content.

Figure 7:
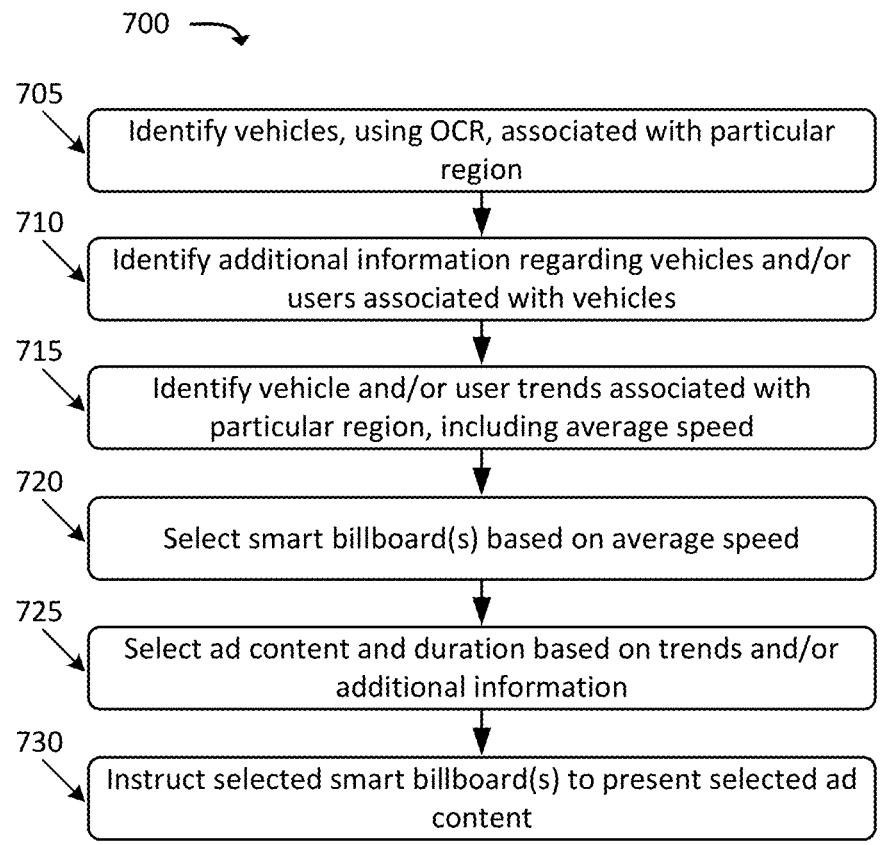
FIG. 7 illustrates an example process for selecting ads to present on a smart billboard based on OCR information and/or other information.

FIG. 7 illustrates an example process 700 for selecting ad content to display on one or more smart billboards 210. Process 700 may, in some implementations, be performed by smart billboard controller 215. In other implementations, some or all of process 700 may be performed by one or more other devices.

Process 700 may include identifying (at 705) vehicles, using OCR techniques, associated with a particular region. For example, as described above, smart billboard controller 215 may identify vehicles in a particular region (e.g., vehicles within a viewing frustum of a camera associated with OCR system 205, vehicles that are within visual range of a particular smart billboard 210, and/or a region defined in some other way), based on license plates identified using OCR techniques (e.g., by OCR system 205).

Process 700 may also include identifying (at 710) additional information regarding the vehicles and/or users associated with the vehicles. For example, smart billboard controller 215 may identify information, stored by user information repository 225, which may include additional information regarding the vehicles (identified at 705), and/or of users associated with the vehicles. As mentioned above, for instance, user information repository 225 may store information that links users to vehicles.

Process 700 may further include identifying (at 715) vehicle and/or user trends associated with the particular region. For example, as described above, smart billboard controller 215 may identify trends and/or other information, regarding the vehicles and/or the users. The trends may, for example, identify quantities and/or proportions of the vehicles and/or users that have certain characteristics (e.g., a quantity or proportion of the vehicles that are of a particular make, a quantity or proportion of the users that are of a particular age or age range, etc.). In some implementations, smart billboard controller 215 may identify an average speed of the vehicles (e.g., based on speed information received from another source, based on readings from multiple OCR cameras, or as determined in some other way).

Figure 8:
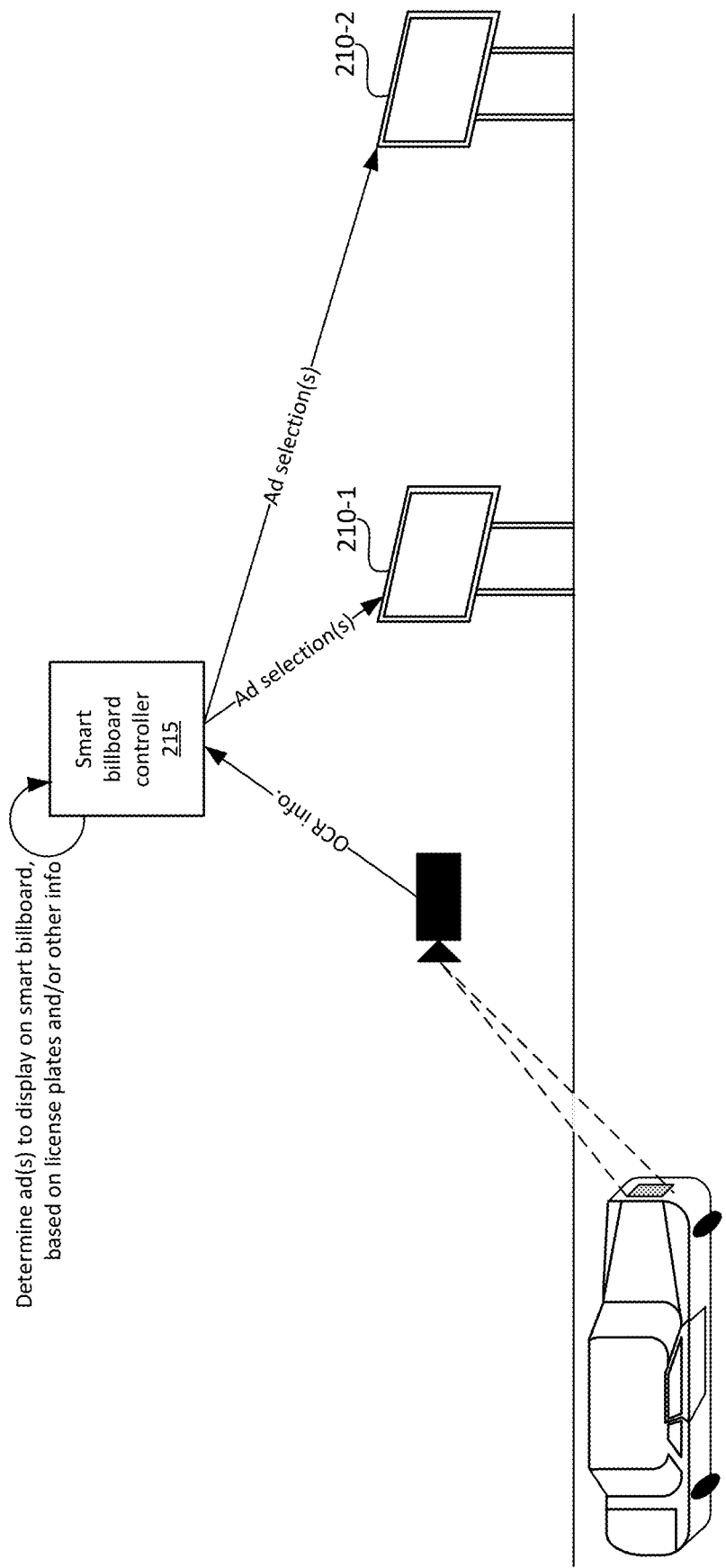
FIGS. 8-10 conceptually illustrate examples of selecting one or more smart billboards on which to present ad content.
Figure 9:
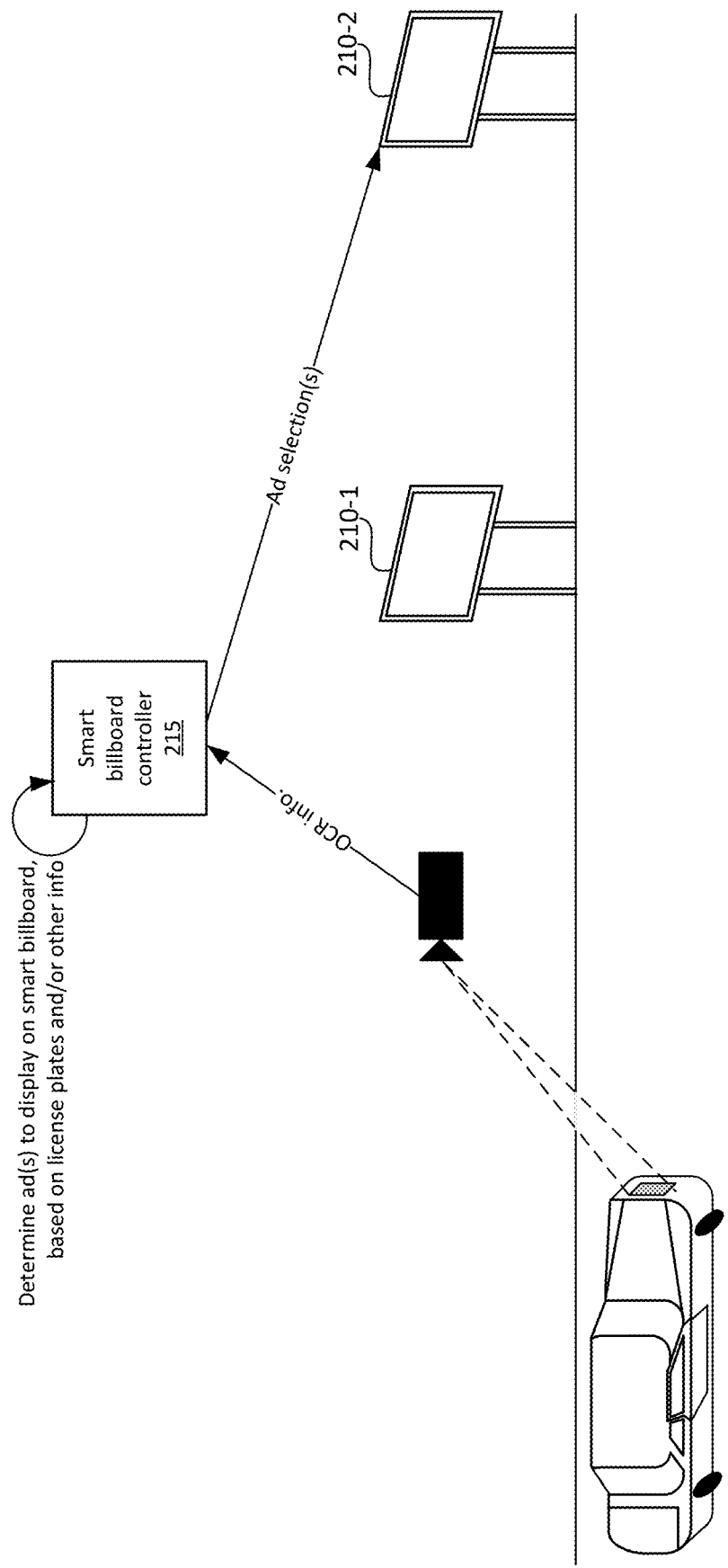
Figure 10:
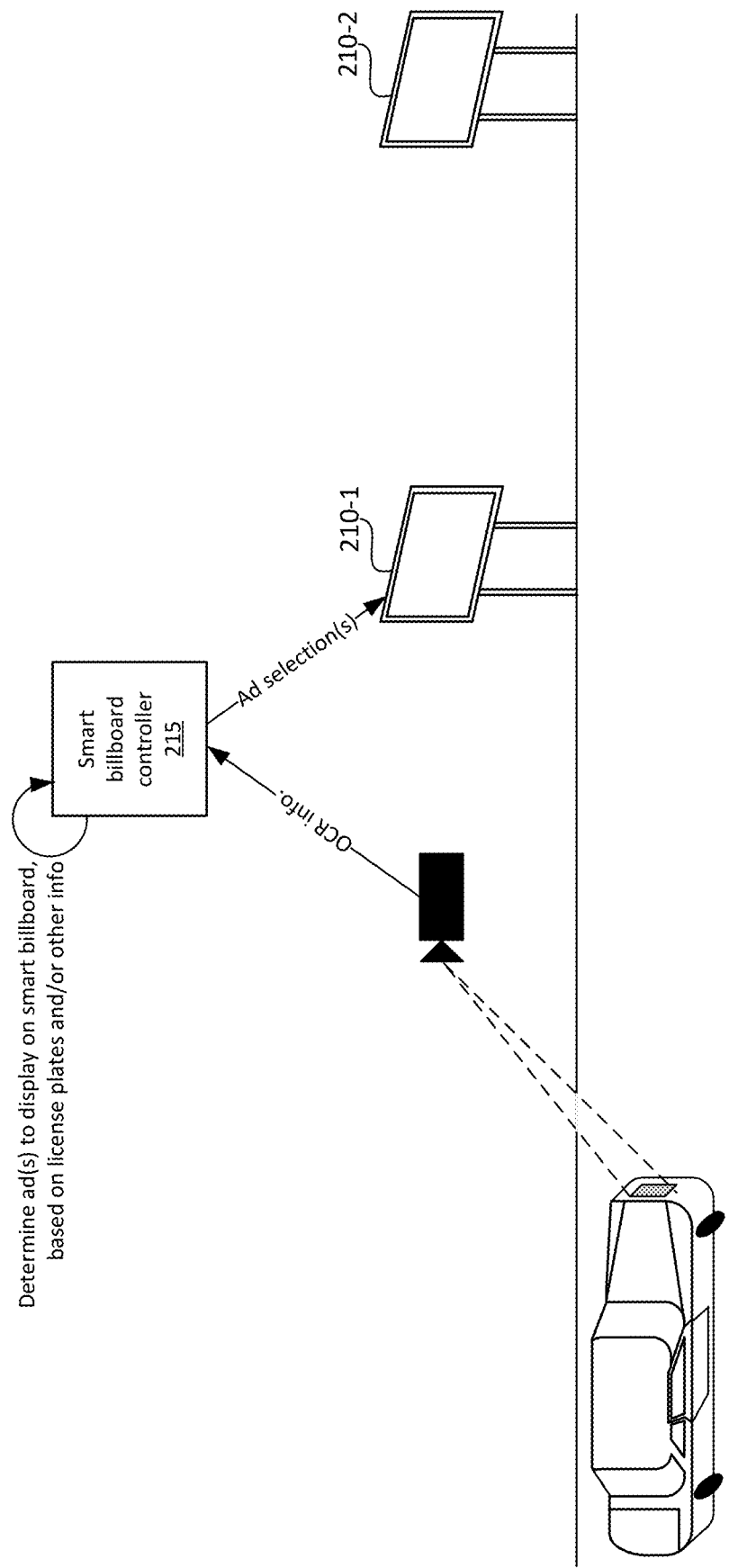

Process 700 may additionally include selecting (at 720) one or more smart billboards based on the average speed. FIGS. 8-10 illustrate examples of selecting one or more smart billboards 210 based on speed. For example, as shown in FIG. 8, multiple smart billboards 210 (shown as smart billboards 210-1 and 210-2) may be selected. This situation may occur when one OCR "covers" regions associated with multiple smart billboards 210-1 and 210-2. Additionally, or alternatively, the average speed of the vehicles may be relatively fast, such that it may be beneficial to show the same ad content on multiple smart billboards 210-1 and 210-2 (e.g., to give users time to view the ad content).

As shown in FIG. 9, smart billboard 210-2 may be selected, while smart billboard 210-1 may not be selected. In this example, smart billboard 210-1 may be "closer" to vehicles identified by an OCR camera (and/or may be closer to the OCR camera itself), but the vehicles may be traveling at such a speed (e.g., a relatively high speed) that it may be beneficial to display the ad content on "farther" smart billboard 210-2. In these situations, ad content, displayed by smart billboard 210-1 may be based on information identified by another OCR system 205, and/or may be "default" ad content.

As shown in FIG. 10, smart billboard 210-1 may be selected, while smart billboard 210-2 may not be selected. In this example, the vehicles may be traveling at such a speed (e.g., a relatively low speed, or a "normal" speed) that it may be beneficial to display the ad content on "closer" smart billboard 210-1. In these situations, ad content, displayed by smart billboard 210-2 may be based on information identified by another OCR system 205, and/or may be "default" ad content.

In some implementations, selecting (at 720) one or more billboards may include selecting a sequence of smart billboards 210. For instance, a first billboard may be selected to present a first image (or video) in a set of images (or videos), a second billboard (e.g., a consecutive or a non-consecutive) billboard may be selected to present a second image (or video) in the set of images (or videos), and so on. In this manner, the sequential smart billboards 210 may "tell a story" by way of presenting different, but related, images or videos.

Returning to FIG. 7, process 700 may also include selecting (at 725) ad content based on the trends and/or additional information (e.g., as identified at 715). In some implementations, smart billboard controller 215 may also select a duration for the ad content. For instance, as described above, smart billboard controller 215 may select ad content based on vehicle and/or user information, trends, etc. Smart billboard controller 215 may compare the identified vehicle and/or user information to advertiser information (e.g., may evaluate conditions associated with ad content) in order to identify ad content to display. As also described above, smart billboard controller 215 may, in some implementations, select a duration for the ad content (e.g., based on conditions associated with the ad content).

Process 700 may further include instructing (at 730) the selected smart billboard(s) 210 to present the selected ad content. For example, smart billboard controller 215 may output, via a wired or a wireless interface, an instruction to the selected smart billboard(s) 210. The instruction may include an identification of the ad content (e.g., a URL, a filename, and/or some other identifier). The instruction may further specify the duration of the selected ad content. Smart billboard(s) 210 may retrieve or identify the ad content (e.g., may retrieve the ad content from an external source or from internal storage), and may present the ad content for the specified duration.

In addition to, or in lieu of, instructing smart billboards 210 to present ad content, smart billboard controller 215 may output selected ads directly to user devices 230, associated with an identified vehicle. For example, smart billboard controller 215 may identify that a particular ad is relevant to one particular user (e.g., based on the user's history, the present location of the vehicle and/or the location history of the vehicle, the make and/or model of the vehicle, and/or one or more other factors), while a different ad is relevant to a different user in the same vehicle. The ads may be "pushed" to user devices 230 (e.g., via short message service ("SMS") messages, multimedia messaging service ("MMS") messages, email, proprietary "push" messages, etc.).

Figure 11:
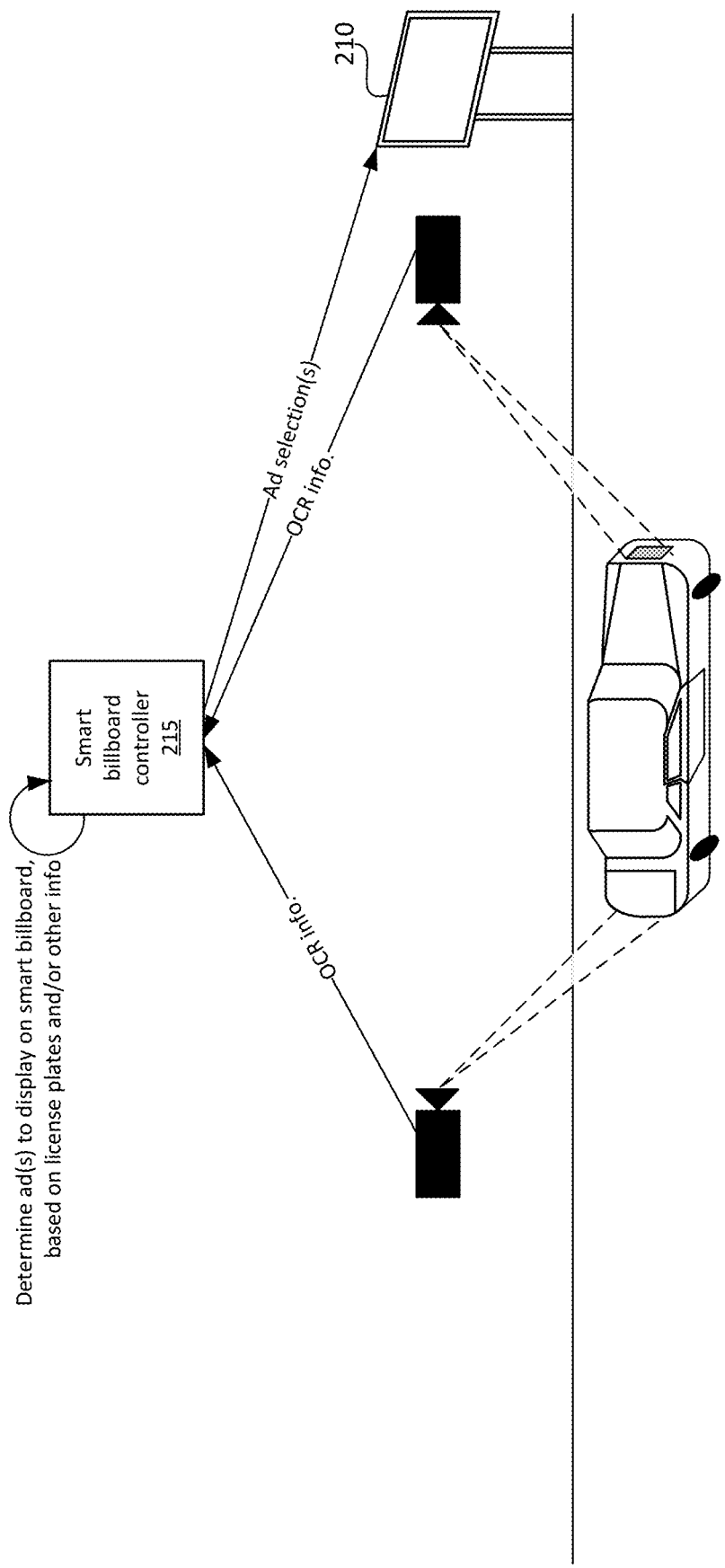
FIG. 11 conceptually illustrates the use of multiple cameras to capture OCR information associated with vehicles.

FIG. 11 illustrates an example of using multiple cameras to obtain OCR information associated with a vehicle. For instance, while some examples and figures above describe OCR recognition in the context of using one OCR camera, in some implementations, multiple OCR cameras may be used in a particular region. For instance, as shown in FIG. 11, OCR cameras, which are facing in substantially opposite directions, may be used to capture images of the front and the rear of a vehicle. This may be useful in situations where certain types of information are available on one portion of a vehicle, but not on other parts (e.g., the make and model may be specified on the rear, but not on the front).

Figure 12:
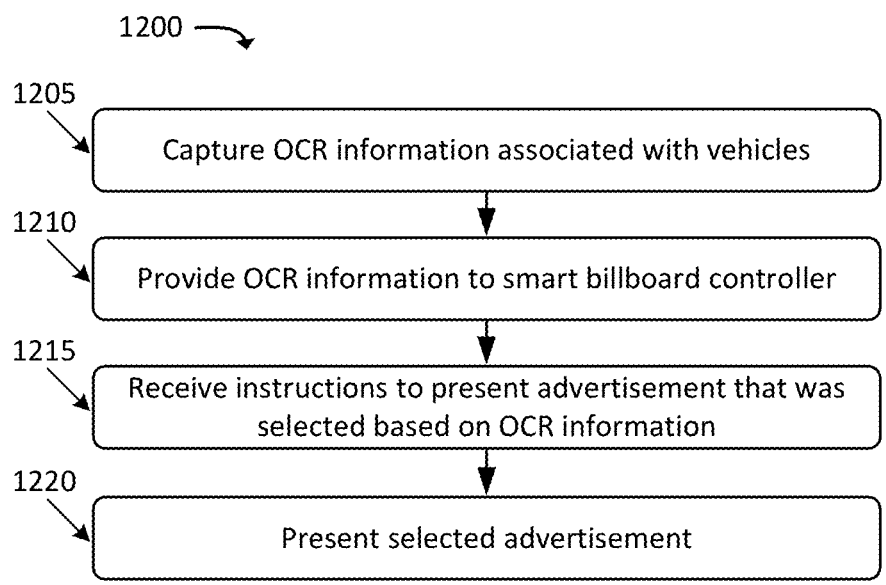
FIG. 12 illustrates an example process for a smart billboard/OCR system capturing OCR information and presenting ad content that was selected based on the OCR information.

FIG. 12 illustrates an example process 1200 for presenting selected ad content based on OCR information. Process 1200 may, in some implementations, be performed by OCR system 205 and/or smart billboard 210. For instance, a system may include OCR system 205 and smart billboard 210. The system may be an integrated system (e.g., a single integrated device may include OCR system 205 and smart billboard 210) or may include multiple distinct devices (e.g., a set of devices, associated with OCR system 205, that are physically separate from smart billboard 210). In other implementations, some or all of process 1200 may be performed by one or more other devices or systems.

Process 1200 may include capturing (at 1205) OCR information associated with vehicles. For instance, as described above, OCR system 205 may capture images associated with vehicles, and may identify text in the images using OCR techniques. The text may correspond to license plates, bumper stickers, decals, emblems, badges, etc.

Process 1200 may also include providing (at 1210) the OCR information to smart billboard controller 215. For example, OCR system 205 may output the OCR information to smart billboard controller 215 via a wired or a wireless interface. As described above, smart billboard controller 215 may select ad content based on the OCR information and/or based on other information.

Process 1200 may further include receiving (at 1215) instructions to present ad content that was selected based on the OCR information. For instance, smart billboard 210 may receive (from smart billboard controller 215 and/or from another source) an identifier of ad content to display, and/or may receive the ad content itself. Process 1200 may additionally include presenting (at 1220) the selected ad content. For instance, smart billboard 210 may present the ad content on a display associated with smart billboard 210.

Figure 13A:
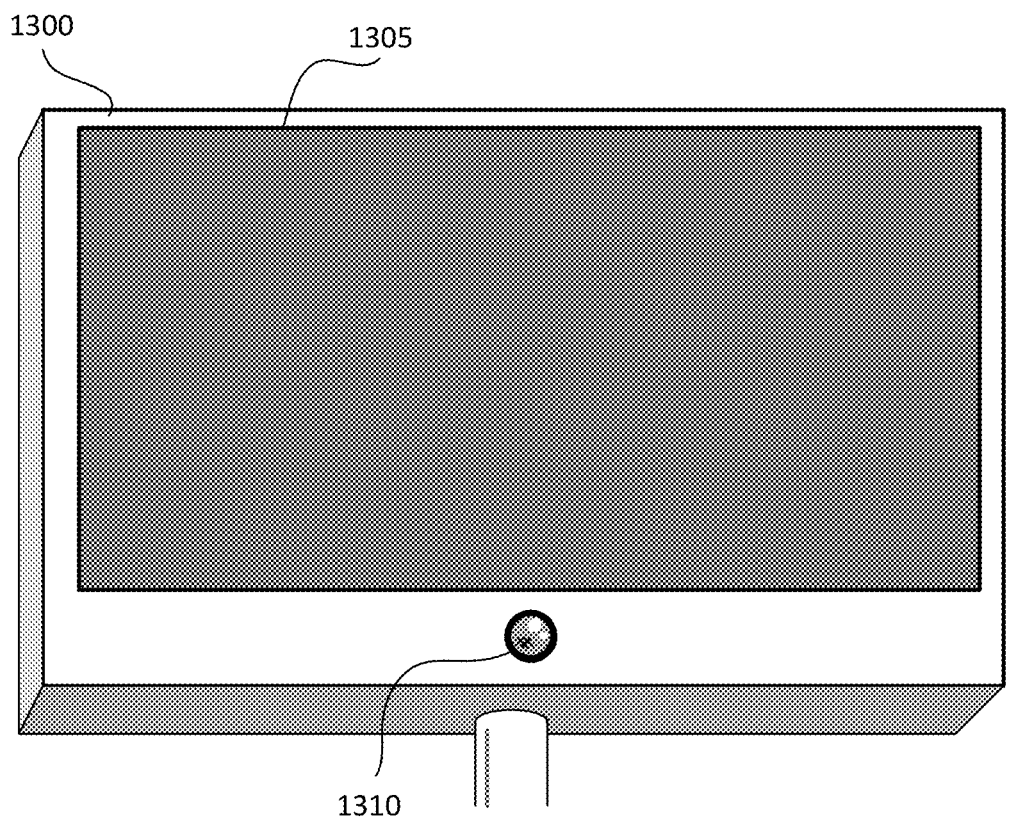
FIGS. 13A and 13B illustrate example arrangements of a smart billboard and a camera, which may be used to capture OCR information, in accordance with some implementations.
Figure 13B:
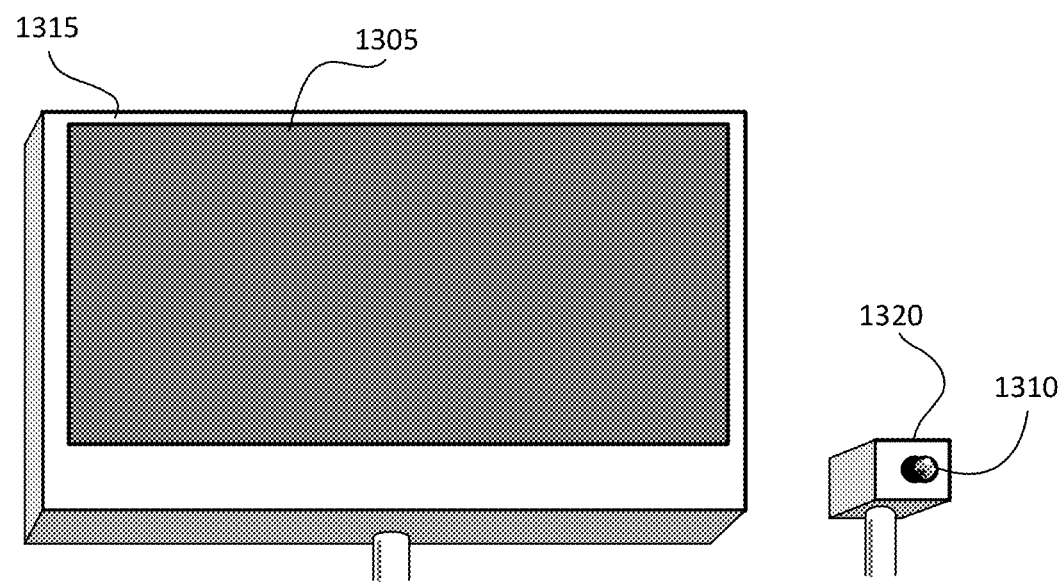

FIGS. 13A and 13B illustrate example arrangements of OCR system 205 and smart billboard 210. For example, as shown in FIG. 13A, housing 1300 may physically contain display 1305 and camera 1310. Display 1305 may be a display associated with smart billboard 210, and camera 1310 may be a camera associated with OCR system 205. Display 1305 may, for example, be an LCD display, an LED display, and/or another type of display. In some implementations, housing 1300 may include hardware circuitry and/or software logic to control the output of display 1305. In some implementations, housing 1300 may include a storage device that stores ad content, which may be retrieved based on instructions received from smart billboard controller 215. In some implementations, housing 1300 may physically contain hardware circuitry and/or software logic associated with OCR system 205. For instance, housing 1300 may include circuitry and/or logic to perform OCR recognition on images captured by camera 1310, and/or communication hardware and/or logic to provide the OCR information to smart billboard controller 215.

As shown in FIG. 13B, housing 1315 may include display 1305, while housing 1320 may include camera 1310. In this figure, housing 1315 may be associated with smart billboard 210, while housing 1320 may be associated with OCR system 205. That is, in this figure, OCR system 205 and smart billboard 210 may be physically separate devices. While example arrangements are shown in FIGS. 13A and 13B, in practice, different arrangements of OCR system 205 and smart billboard 210 are possible.

Figure 14:
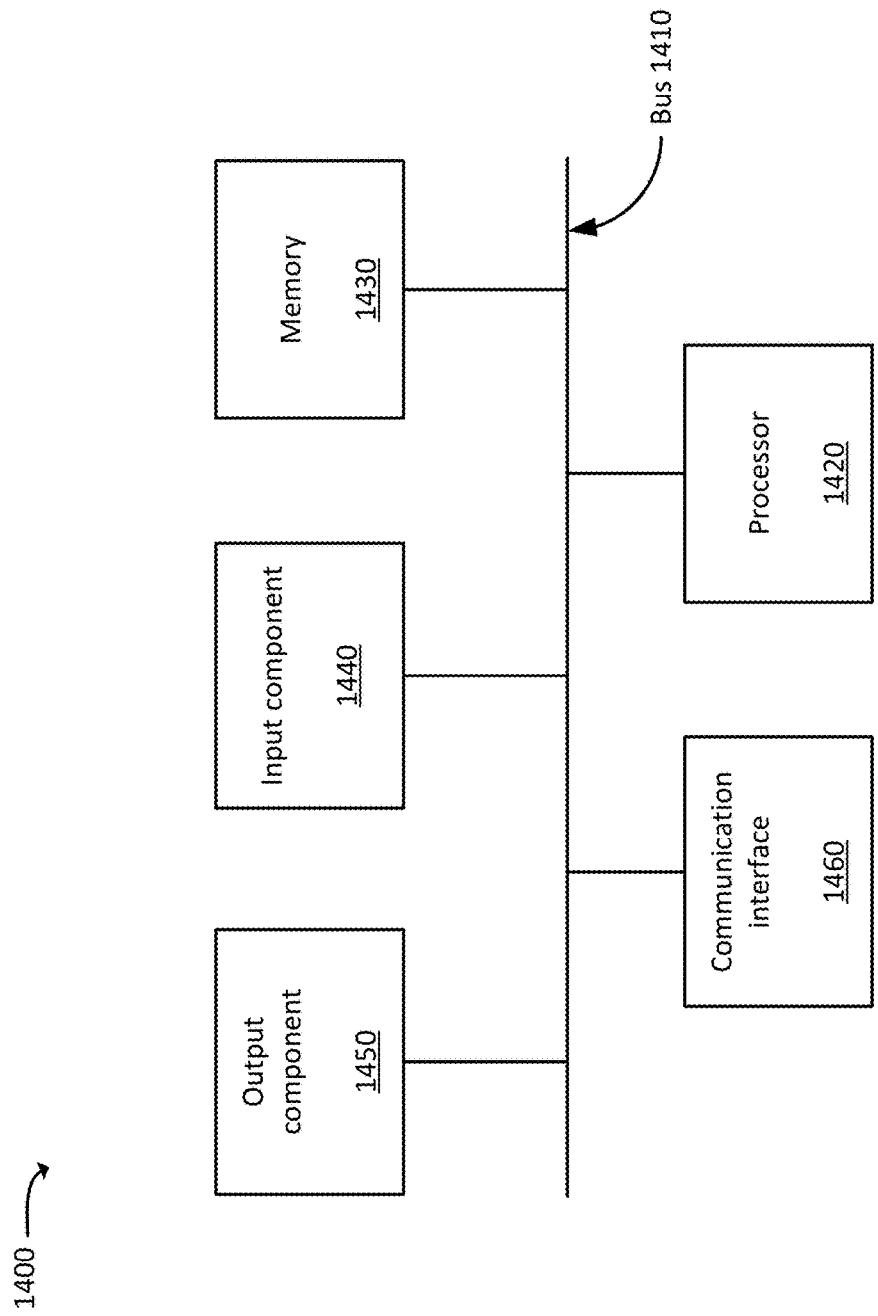
FIG. 14 illustrates example components of a device, in accordance with some implementations described herein.

FIG. 14 is a diagram of example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 7 and 12, the order of the blocks may be modified in other implementations. Further, non-dependent blocks may be performed in parallel.

As another example, while implementations are described above in the context of OCR, other techniques may be used to identify features of vehicles. For example, optical pattern recognition ("OPR") may be used in addition to, or in lieu of, OCR. OPR may be used, for instance, to identify the make and/or model of a vehicle based on recognizing a shape of the vehicle. Further, in addition to, or in lieu of, identifying text on a vehicle, other shapes and/or images (e.g., insignia, logos, and/or badges denoting a make and/or model of the vehicle) may be identified.

Furthermore, while above implementations are described above in the context of advertisements, other content may be presented on smart billboards, in addition to, or in lieu of, advertisements. For example, information other than advertisements, which may be of interest to (or otherwise relevant to) individuals may be presented on the smart billboards. Such information may include weather information, traffic information, emergency alerts, breaking news, and/or other types of information. In some implementations, the information, presented on smart billboards, may be based on subscriptions associated with users in the vicinity of the smart billboards. For instance, a set of users, in the vicinity of a particular smart billboard, may have a subscription to a premium news service. Based on the subscriptions, content from the premium news service may be presented on the smart billboard.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms), As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by one or more devices, information regarding a first set of license plates, associated with a first set of vehicles, that have been visually detected by a first set of video input devices that have a field of view that includes a first region, are located within the first region during a first time period;
   determining, by the one or more devices, a first set of location information indicating one or more geographical locations at which a first set of user devices have been physically located, wherein determining the first set of location information includes at least one of:
      determining the first set of location information using a cell triangulation technique, or
      determining the first set of location information based on a global positioning system ("GPS") technique performed by one or more user devices, of the first set of user devices,
   determining, by the one or more devices and based on determining the first set of location information, that the first set of user devices are located within the first region during the first time period;
   receiving, by the one or more devices, information regarding a second set of license plates, associated with a second set of vehicles, that have been visually detected, by the first set of video input devices, as being located within the first region during a second time period;
   determining, by the one or more devices, a second set of location information indicating one or more geographical locations at which a second set of user devices have been physically located, wherein determining the second set of location information includes at least one of:
      determining the second set of location information using the cell triangulation technique, or
      determining the second set of location information based on the GPS technique performed by one or more user devices, of the second set of user devices,
   determining, by the one or more devices and based on determining the second set of location information, that the second set of user devices are located within the first region during the second time period;
   identifying, by the one or more devices, a particular user device that is present in both the first and second sets of user devices;
   identifying, by the one or more devices, a particular license plate that is present in both the first and second sets of license plates;
   correlating, by the one or more devices, the particular user device to the particular license plate by identifying that the particular user device and the particular license plate are present in both the first and second sets of user devices and license plates, respectively;
   receiving, by the one or more devices, information indicating that the particular license plate has been visually detected, by a second set of video input devices that have a field of view that includes a second region, as being present on a particular vehicle in a particular lane of a road in the second region, wherein a billboard device is within a line of sight of the second region, wherein the billboard device is polarized such that a plurality of different polarized display areas are visible to different lanes of the road;
   identifying, by the one or more devices and based on the information indicating that the particular license plate has been visually detected on the particular vehicle in the second region, one or more trends associated with the particular user device that is associated with the particular license plate;
   selecting, by the one or more devices and based on the correlation of the particular user device to the particular license plate, content to display on the billboard device, the content being selected further based at least in part on the one or more trends associated with the particular user device; and
   outputting, by the one or more devices, an instruction to the billboard device, the instruction causing the billboard device to present the selected content to the particular lane of the road via a particular one of the polarized display areas.

2. The method of claim 1, wherein the information regarding the particular license plate includes a license plate number associated with the particular license plate.

3. The method of claim 1, wherein the information for the first set of license plates or the second set of license plates includes text that has been identified using an optical character recognition ("OCR") technique on one or more images, captured by at least one of the first set or the second set of video input devices, that include the first set of vehicles or the second set of vehicles, respectively.

4. The method of claim 1, further comprising:
   determining an average speed of a third set of vehicles that includes the particular vehicle; and
   determining, based on the average speed of the third set of vehicles, a duration that the selected content should be presented,
      wherein the instruction further causes the billboard device to present the selected content for the determined duration.

5. The method of claim 1, wherein the one or more trends associated with the particular user device, based on which the content is selected, are based on at least one of:
   a location history of the particular user device,
   a web browsing history of the particular user device, or
   a purchase history associated with the particular user device.

6. The method of claim 1, further comprising identifying a quantity or proportion of vehicles, of a third set of vehicles that include the particular vehicle and are present in the second region, that are a particular make or model,
   wherein the content is selected further based on the identified particular make or model of the quantity or proportion of the third set of vehicles.

7. A device, comprising:
   a memory device storing a set of processor-executable instructions; and a processor configured to execute the processor-executable instructions, wherein executing the processor-executable instructions causes the processor to:
receive information regarding a first set of license plates associated with a first set of vehicles, that have been visually detected by a first set of video input devices that have a field of view that includes a first region, are located within the first region during a first time period;
determine a first set of location information indicating one or more geographical locations at which a first set of user devices have been physically located, wherein determining the first set of location information includes at least one of:
determining the first set of location information using a cell triangulation technique, or
determining the first set of location information based on a global positioning system ("GPS") technique performed by one or more user devices, of the first set of user devices,
determine, based on determining the first set of location information, that the first set of user devices are located within the first region during the first time period;
receive information regarding a second set of license plates associated with a second set of vehicles, that have been visually detected, by the first set of video input devices, as being located within the first region during a second time period;
determine a second set of location information indicating one or more geographical locations at which a second set of user devices have been physically located, wherein determining the second set of location information includes at least one of:
determining the second set of location information using the cell triangulation technique, or
determining the second set of location information using the GPS technique performed by one or more user devices, of the second set of user devices,
determine, based on determining the second set of location information, that the second set of user devices are located within the first region during the second time period;
identify a particular user device that is present in both the first and second sets of user devices;
identify a particular license plate that is present in both the first and second sets of license plates;
correlate the particular user device to the particular license plate by identifying that the particular user device and the particular license plate are present in both the first and second sets of user devices and license plates, respectively;
receive information indicating that the particular license plate has been visually detected, by a second set of video input devices that have a field of view that includes a second region, as being present on a particular vehicle in a particular lane of a road in the second region, wherein a billboard device is within a line of sight of the second region, wherein the billboard device is polarized such that a plurality of different polarized display areas are visible to different lanes of the road;
identify, based on the information indicating that the particular license plate has been visually detected on the particular vehicle in the second region, one or more trends associated with the particular user device that is associated with the particular license plate;
select, based on the correlation of the particular user device to the particular license plate, content to display on the billboard device,
the content being further selected based at least in part on the one or more trends associated with the particular user device; and
output an instruction to the billboard device, the instruction causing the billboard device to present the selected content to the particular lane of the road via a particular one of the polarized display areas.

8. The device of claim 7, wherein executing the processor-executable instructions further causes the processor to identify a quantity or proportion of vehicles, of a third set of vehicles that include the particular vehicle and are present in the second region, that are a particular make or model,
wherein the content is selected further based on the identified particular make or model of the quantity or proportion of the third set of vehicles.

9. The device of claim 7, wherein the information regarding the first set of license plates or the second set of license plates includes text that has been identified using an optical character recognition ("OCR") technique on one or more images, captured by at least one of the first set or the second set of video input devices, that include the first set of vehicles or the second set of vehicles, respectively.

10. The device of claim 7, wherein executing the processor-executable instructions further causes the processor to:
determine an average speed of a third set of vehicles that includes the particular vehicle; and
determine, based on the average speed of the third set of vehicles, a duration that the selected content should be presented,
wherein the instruction, outputted to the billboard device, further causes the billboard device to present the selected content for the determined duration.

11. The device of claim 7, wherein the one or more trends, associated with particular user device, based on which the content is selected, are based on at least one of:
a location history of the particular user device,
a web browsing history of the particular user device, or
a purchase history associated with the particular user device.

12. A method, comprising:
receiving, by one or more devices, one or more images, captured by a first set of cameras that have a field of view that includes a first portion of a road, the images depicting a first set of vehicles that are present on the first portion of the road within a first timeframe;
identifying, by the one or more devices and using an optical character recognition ("OCR") technique, license plate information associated with the first set of vehicles;
determining, by the one or more devices and using a cell triangulation technique, location information for a plurality of user devices;
identifying, by the one or more devices, a first set of user devices, of the plurality of user devices, that have been detected, using the cell triangulation technique, as being within a particular proximity of the first portion of the road within the first timeframe;
receiving, by the one or more devices, one or more images, captured by a second set of cameras that have a field of view that includes a second portion of the road, the images depicting a second set of vehicles that are present on the second portion of the road within a second timeframe;

identifying, by the one or more devices and using an OCR technique, license plate information associated with the second set of vehicles;

identifying, by the one or more devices, a second set of user devices, of the plurality of user devices, that have been detected, using the cell triangulation technique, as being within the particular proximity of the second portion of the road within the second timeframe;

correlating, by the one or more devices, a particular user device to a particular vehicle by identifying that the particular user device is present in both the first and second sets of user devices and that the particular vehicle is present in both the first and second sets of vehicles;

selecting, by the one or more devices and based on the correlation of the particular user device to the particular license plate, content,
the selecting being further based on the information identifying that the particular user device is associated with the particular vehicle;

determining, by the one or more devices, that a third set of vehicles, that includes the particular vehicle, have been visually detected as being present in a particular lane of a third portion of the road by a third set of cameras that have a field of view that includes the third portion of the road, wherein a billboard display is within a line of sight of the third portion of the road, wherein the billboard device is polarized such that a plurality of different polarized display areas are visible to different lanes of the third portion of the road; and presenting, via the billboard display, by the one or more devices, and based on visually detecting the particular vehicle on the third portion of the road, the content to the particular lane of vehicles the third portion of the road via a particular one of the polarized display areas.

13. The method of claim 12, further comprising:
receiving, from a particular user, linking information that identifies the particular license plate as being associated with the particular user,
wherein the content is further selected based on the linking information that identifies the particular user as being associated with the particular license plate.

14. The method of claim 12, wherein identifying that the particular user device is present in both the first and second sets of user devices includes identifying that the particular user device is the only user device that is present in both the first and second sets of user devices, and
wherein identifying that the particular vehicle is present in both the first and second sets of vehicles includes identifying that the particular vehicle is the only vehicle that is present in both the first and second sets of vehicles.

15. The method of claim 14, wherein the particular user device is a first user device,
wherein the first set of user devices includes a second user device, and
wherein the second set of user devices does not include the second user device.

16. The method of claim 15, wherein the particular vehicle is a first vehicle,
wherein the first set of user devices includes a second vehicle, and
wherein the second set of user devices does not include the second vehicle.

17. The method of claim 1, wherein identifying that the particular user device is present in both the first and second sets of user devices includes identifying that the particular user device is the only user device that is present in both the first and second sets of user devices, and
wherein identifying that the particular license plate is present in both the first and second sets of license plates includes identifying that the particular license plate is the only license plate that is present in both the first and second sets of license plates.

18. The method of claim 17, wherein the particular user device is a first user device and the particular license plate is a first license plate,
wherein the first set of user devices includes a second user device,
wherein the second set of user devices does not include the second user device,
wherein the first set of license plates includes a second license plate, and
wherein the second set of license plates does not include the second license plate.

19. The device of claim 7, wherein identifying that the particular user device is present in both the first and second sets of user devices includes identifying that the particular user device is the only user device that is present in both the first and second sets of user devices, and
wherein identifying that the particular license plate is present in both the first and second sets of license plates includes identifying that the particular license plate is the only license plate that is present in both the first and second sets of license plates.

20. The device of claim 19, wherein the particular user device is a first user device and the particular license plate is a first license plate,
wherein the first set of user devices includes a second user device,
wherein the second set of user devices does not include the second user device,
wherein the first set of license plates includes a second license plate, and
wherein the second set of license plates does not include the second license plate.

* * * * *